June 9, 1931.  C. M. MacGREGOR  1,809,176
MEANS FOR SELECTIVELY CONTROLLING RINGING CIRCUITS OF TELEPHONES
Filed March 26, 1930
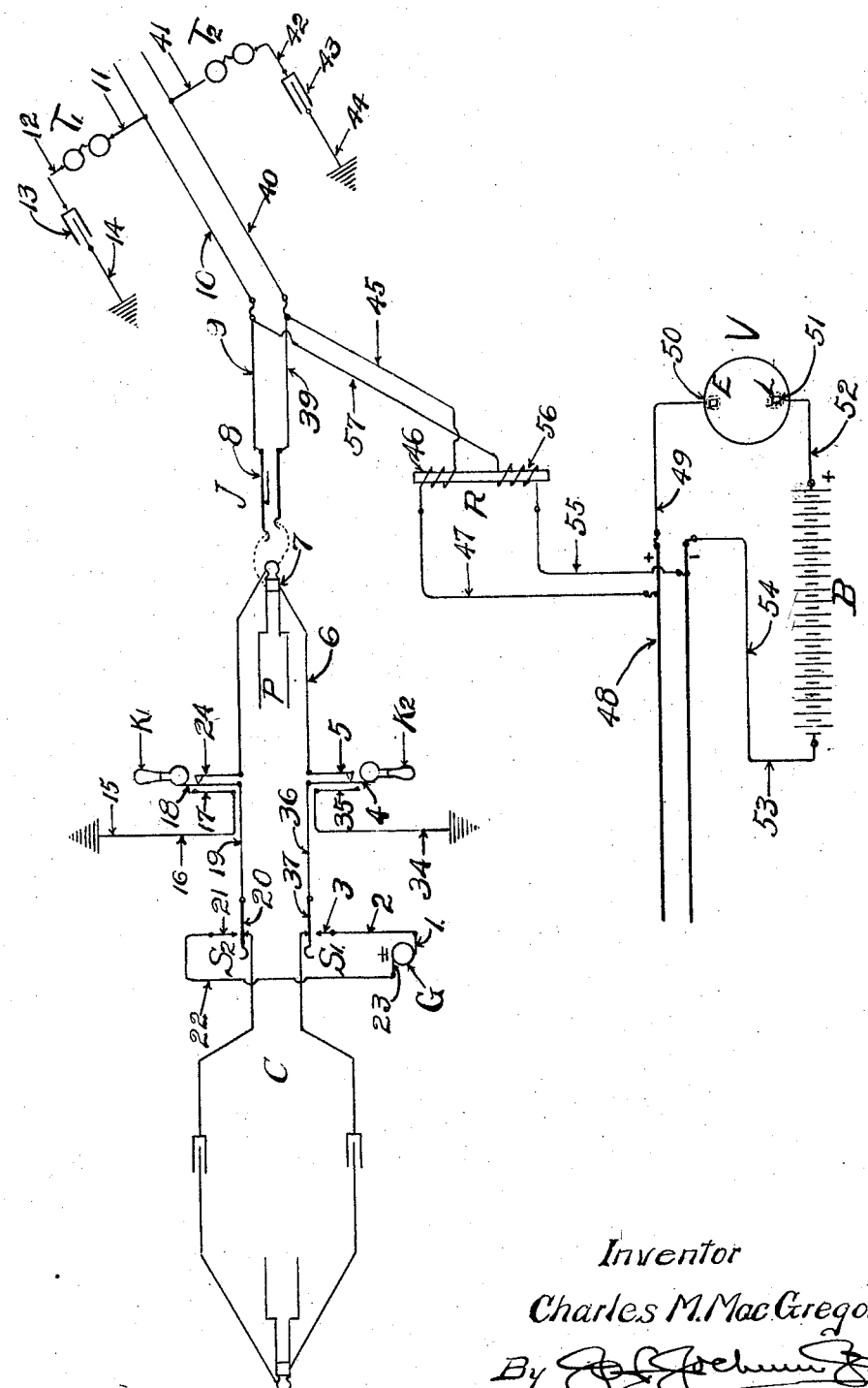
Inventor
Charles M. MacGregor,
By 
Attorney Patented June 9, 1931

1,809,176

UNITED STATES PATENT OFFICE

CHARLES M. MacGREGOR, OF CHICAGO, ILLINOIS

MEANS FOR SELECTIVELY CONTROLLING RINGING CIRCUITS OF TELEPHONES

Application filed March 26, 1930. Serial No. 438,927.

This invention relates in general to telephone ringing circuits, but has particular reference to improved means whereby an operator may selectively ring the bells on either side of a divided line without causing any ringing or sounding of the bells on the other side of the line, and is particularly adapted for use with common battery switchboard circuits having relays bridged permanently across the line.

A further object of the invention is to provide in the line rectifier cells or electrical valve units which operate in the nature of a valve which will permit the current to pass in one direction only through the said units and prevent the current from flowing in the opposite direction.

A further object is to provide improved means whereby selective ringing, or divided circuit ringing may be provided with greater economy than by using a two party so-called harmonic ringing where it is necessary to employ two harmonic ringing generators and vibrators at the central office, with the result that the cost of maintenance and of the service to the users will be reduced to a minimum.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which The figure is a diagrammatic view and a wiring diagram of a ringing circuit of the character constructed and arranged in accordance with the principles of this invention.

Referring more particularly to the drawing the letter G designates an alternating current ringing generator of the ordinary type and employed as standard equipment in telephone exchanges connected to cord circuit C by keys $S'$ and $S^2$.

The letters $K'$ and $K^2$ designate selector keys; P a spring jack plug, J a spring jack of the ringer circuits of the telephone $T'$ and $T^2$ respectively; R a relay bridged across the line and connected to bus bars 48 and 54 respectively, and V an electrical valve unit connected to the battery B in series in the circuit with the battery.

Any electrical valve unit suitable for the purpose may be employed but a simple and efficient unit embodies a cell having a tantalum electrode E and and a lead electrode L, the positive side of the battery being connected with the lead electrode L by means of the conductor 52, contact 51, and the tantalum electrode E being connected at contact 50 with the bus bar 48 by means of a conductor 49, with the result that when the alternating currents from the ringing mechanism are in circuit with the line, they cannot pass through the battery B which is bridged across the line, as the unit V will not allow the current to flow in the opposite direction, the unit thereby acting as a rectifier.

In operation the alternating current from the generator G is admitted through the switch keys $S'$ and $S^2$ which operate together by means of standard switchboard key cam, and open or close the generator circuit as the occasion is required by the switchboard operator.

Current from the generator is sent through the brush or vibrator 1, conductor 2, contact 3, to spring contact 37, of switch key $S'$, when cam (not shown) is moved by the operator, then through conductor 36, spring contact 4, and when crank or cam $K^2$ is normal, to spring contact 5, conductor 6 which leads into plug P. When plug P is inserted into the jack J, contact is made on jack spring 8, so that current will flow through conductor 9, conductor 10, conductor 11, telephone ringer coils of telephone $T'$, conductor 12, condenser 13, to ground conductor 14, thence making ground connection with ground 15, and when cam $K'$ is operated by the operator, circuit is continued through conductor 16, key spring 17, contact on spring 18, conductor 19, spring 20 of switch key $S^2$ when key is operated by switchboard operator to make contact from 20 to 21, through conductor 22, to generator contact 23 or brush of generator G, making a complete alternating circuit through the telephone bell coils of telephone T, causing the bells to ring or sound to the alternating current produced from the generator G by the path or circuit just described. While this circuit as described is the most direct electrical circuit and of least resistance in said circuit from the generator, there is also bridged across this common battery line circuit, a circuit consisting of a conductor 57 to line conductor 9, through coil 56 of relay R, conductor 55 to bus bar 54, conductor 53, to negative side of battery B, thence through battery B, through positive contact to conductor 52, contact 51 of the electric valve V, through valve to contact 50, conductor 49, bus bar 48, conductor 47, coil 46 of relay R, conductor 45, on to line conductor 39, of subscriber's common battery telephone line, also through conductor 40, ringer coils 41 of telephone $T^2$, through conductor 42, condenser 43, ground conductor 44, thence over to ground conductor 15, conductor 16, spring 17 of cam K', and since in this operation cam K' is operated so that 17 is in contact with 18, released from contact 24, and connected with conductor 19, conductor 20 of spring $S^2$, which in this operation is actuated to connect with contact 21, conductor 22, contact 23 of generator G, completing the circuit in so far as a pulsating current is concerned, but not a circuit for an alternating current, because in the above circuit as bridged across the line and as shown, there is connected in series in said circuit an electrical valve or unit V, through which a current will pass in one direction only and no alternating current can flow through this path, which allows a pulsating current or a ringing current from generator G to give pulsations all in one direction, but since in this circuit in series is a condenser 43, which does not admit pulsations of electricity in one direction, causing no ringing of bells of telephone $T^2$.

It will therefore be manifest that with this arrangement the operator at the switchboard of a common battery switchboard telephone line circuit, may by the key control in the cord circuits of the switchboard, ring the bells which are on one side of the common battery telephone line circuit while the telephone bells connected on the other side of the line circuit remain silent.

Furthermore, it is possible to give subscribers of this type of selective ringing telephones on a line a cheaper rate for service than by employing the other more complicated and expensive systems.

What is claimed as new is:—

1. Means for selectively controlling the ringing circuits of telephones in a common battery switchboard equipment, said means embodying a relay bridged across the subscriber's line and in series with the battery, and an electrical valve unit between the battery and said relay and in series with the battery.

2. Means for selectively controlling the ringing circuits of telephones in a common battery switchboard equipment, embodying the cord circuits of the switchboard, a key control in the cord circuits, a relay bridged across the subscriber's line and in series with the battery, and an electrical valve unit between the battery and said relay and in series with the battery.

3. Means for selectively controlling the ringing circuits of telephones in a common battery switchboard equipment, said means embodying bus bars in series with the battery, a relay bridged across the subscriber's line and in series with the said bus bars, and an electrical valve unit between said relay and the battery and in series with the battery and the major bus bar.

4. Means for selectively controlling the ringing circuit of telephones in a common battery switchboard equipment, said means embodying a jack plug and keys of a cord circuit, a spring jack in the ringer circuits, a relay bridged across the subscriber's line, bus bars in series with the battery and to which bus bars the relay is connected in series, and an electrical valve unit connected to the battery in series in the circuit with the battery.

5. Means for selectively controlling the ringing circuits of telephones in a common battery switchboard equipment, said means embodying a relay bridged across the subscriber's line and in series with the battery, and an electrical valve unit connected in series in the circuit and through which unit a current will pass in one direction only.

6. Means for selectively controlling the ringing circuits of telephones in a common battery switchboard equipment, said means embodying a relay bridged across the subscriber's line and in series with the battery, a condenser in the ringing circuit, and an electrical valve unit connected in series in the circuit and through which unit a current will pass in one direction only.

In testimony whereof I have signed my name to this specification, on this 17th day of March, A. D. 1930.

CHARLES M. MacGREGOR.